(12) United States Patent
Kita et al.

(10) Patent No.: US 10,549,787 B2
(45) Date of Patent: Feb. 4, 2020

(54) VEHICLE BODY FLOOR STRUCTURE

(71) Applicant: HONDA MOTOR CO., LTD., Tokyo (JP)

(72) Inventors: Ryo Kita, Wako (JP); Takuya Morisawa, Wako (JP); Takeshi Yoshimoto, Wako (JP); Hirotaka Yamaguchi, Wako (JP); Tomonari Takahashi, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 114 days.

(21) Appl. No.: 15/956,318

(22) Filed: Apr. 18, 2018

(65) Prior Publication Data

US 2018/0304937 A1 Oct. 25, 2018

(30) Foreign Application Priority Data

Apr. 25, 2017 (JP) ................................. 2017-086029

(51) Int. Cl.
*B62D 25/20* (2006.01)

(52) U.S. Cl.
CPC ..... *B62D 25/2036* (2013.01); *B62D 25/2018* (2013.01)

(58) Field of Classification Search
CPC ........ B62D 21/06; B62D 21/08; B62D 21/15; B62D 25/20; B62D 25/2018; B62D 25/2036
USPC ........................................ 296/193.07, 193.09
See application file for complete search history.

(56) References Cited

U.S. PATENT DOCUMENTS

| | | | | |
|---|---|---|---|---|
| 6,145,923 A * | 11/2000 | Masuda | ............... | B62D 25/082 296/1.03 |
| 7,469,957 B1 * | 12/2008 | Boettcher | .............. | B62D 21/02 296/193.07 |
| 8,668,248 B2 * | 3/2014 | Ishizono | .............. | B62D 25/025 296/187.08 |
| 8,714,636 B2 * | 5/2014 | Wanke | ............... | B62D 25/2018 296/203.02 |
| 8,985,681 B2 * | 3/2015 | Fujii | ...................... | B62D 21/11 296/204 |
| 9,821,857 B2 * | 11/2017 | Cesarano | ........... | B62D 25/2009 |
| 2012/0212009 A1 * | 8/2012 | Ishizono | .............. | B62D 25/025 296/193.07 |
| 2012/0256446 A1 * | 10/2012 | Yasuhara | ............... | B62D 21/11 296/193.07 |

FOREIGN PATENT DOCUMENTS

JP 2014-043133 A 3/2014

* cited by examiner

*Primary Examiner* — Jason S Daniels
(74) *Attorney, Agent, or Firm* — Rankin, Hill & Clark LLP (57) ABSTRACT

An object of the present invention is to provide a vehicle body floor structure capable of effectively preventing deformation of a floor panel by increasing bending strength of the floor panel even when an upper reinforcing member of the floor panel is removed. A vehicle body floor structure of the present invention includes a dash cross member disposed along a kick-up portion on a lower surface side of a floor panel, a novel front side frame having an outer frame and an inner frame at a rear portion of a side frame body, and a floor panel on which beads are formed to form a closed cross-section in cooperation with the outer frame and the inner frame.

7 Claims, 6 Drawing Sheets

VEHICLE BODY FLOOR STRUCTURE

CROSS REFERENCE TO RELATED APPLICATIONS

This application claims the foreign priority benefit under Title 35, United States Code, § 119 (a)-(d) of Japanese Patent Application No. 2017-086029, filed on Apr. 25, 2017, the disclosure of which is herein incorporated by reference in its entirety.

TECHNICAL FIELD

The present invention relates to a vehicle body floor structure of a vehicle such as an automobile.

BACKGROUND ART

Conventionally, a vehicle body floor structure has been known, which includes a dash cross member extending in a vehicle width direction on a vehicle inner side of a dash lower panel, wherein a lower end of the dash lower panel and a front end of a floor panel are joined together (for example, see Patent Document 1). In the vehicle body floor structure, position of a joint portion between the dash lower panel and the floor panel is set to be substantially the same as or behind a joint portion between the dash lower panel and the dash cross member. Further, in the vehicle body floor structure, an upper reinforcing member overlapping the floor panel is disposed in order to prevent deformation of the floor panel in the vicinity of feet of a driver due to a collision load. With such a vehicle body floor structure, the collision load input to a front side frame is transmitted rearward via the dash lower panel and the dash cross member.

CITATION LIST

Patent Literature

Patent Document 1: Japanese Patent Application Publication No. 2014-043133

SUMMARY OF INVENTION

Technical Problem

However, in a conventional vehicle body floor structure, there has been a problem that when the collision load is input, bending strength of the floor panel in a kick-up portion is insufficient and deformation of the floor panel at the feet of the driver cannot be effectively prevented. With respect to the conventional vehicle body floor structure, there has also been a request to remove the upper reinforcing member of the floor panel in order to, for example, reduce the number of parts and manufacturing costs.

An object of the present invention is to provide a vehicle body floor structure capable of effectively preventing deformation of a floor panel by increasing bending strength of the floor panel even when an upper reinforcing member of the floor panel is removed.

Solution to Problem

A vehicle body floor structure of the present invention having achieved the above object includes a dash cross member extending in a vehicle width direction along a kick-up portion which raises an upper end of a floor panel toward a lower end of a dash lower panel, a front side frame having an outer frame extending obliquely rearward and outward in the vehicle width direction from a branch portion formed in a rear portion of a side frame body extending in a longitudinal direction on both sides in the vehicle width direction, and having an inner frame extending obliquely rearward and inward in the vehicle width direction from the branch portion with a rear end fixed to a front seat support cross member supporting a front portion of a front seat, and beads formed in the floor panel to extend and open rearward in a V-shape in plan view according to branch directions of the outer frame and the inner frame, wherein the branch portion of the front side frame is formed adjacent to an end portion in the vehicle width direction of the dash cross member, a floor panel portion located at least behind the dash cross member and in front of the front seat support cross member is formed of a steel material having higher strength than the dash lower panel, and each of the beads and the outer frame or the inner frame are overlapped in a vertical direction to increase a closed cross-section in cooperation with each other.

Advantageous Effects of Invention

According to the present invention, it is possible to provide a vehicle body floor structure capable of effectively preventing deformation of a floor panel by increasing bending strength of the floor panel even when an upper reinforcing member of the floor panel is removed.

DESCRIPTION OF EMBODIMENTS

A vehicle body floor structure of an embodiment (the present embodiment) of the present invention will be described in detail with reference to the drawings. The vehicle body floor structure of the present embodiment includes a dash cross member disposed along a kick-up portion on a lower surface side of a floor panel, a novel front side frame having an outer frame and an inner frame at a rear portion of a side frame body corresponding to a conventional front side frame, and a floor panel on which beads are formed to increase a closed cross-section in cooperation with the outer frame and the inner frame. Further, as will be described in detail later, in the present embodiment, it is assumed that a steel material having higher strength than a dash lower panel is used for a floor panel portion on which the beads are formed. In the drawings referred to in the following description, "FRONT and REAR" indicates a vehicle longitudinal direction (front and rear direction), "LEFT and RIGHT" indicates a vehicle width direction (left and right direction), and "UP and DOWN" indicates a vertical direction (up and down direction). In the following, outline of a vehicle body front portion to which the vehicle body floor structure of the present embodiment is applied will be described first, and then the vehicle body floor structure will be described.

<<Outline of Vehicle Body Front Portion>>

Figure 1:
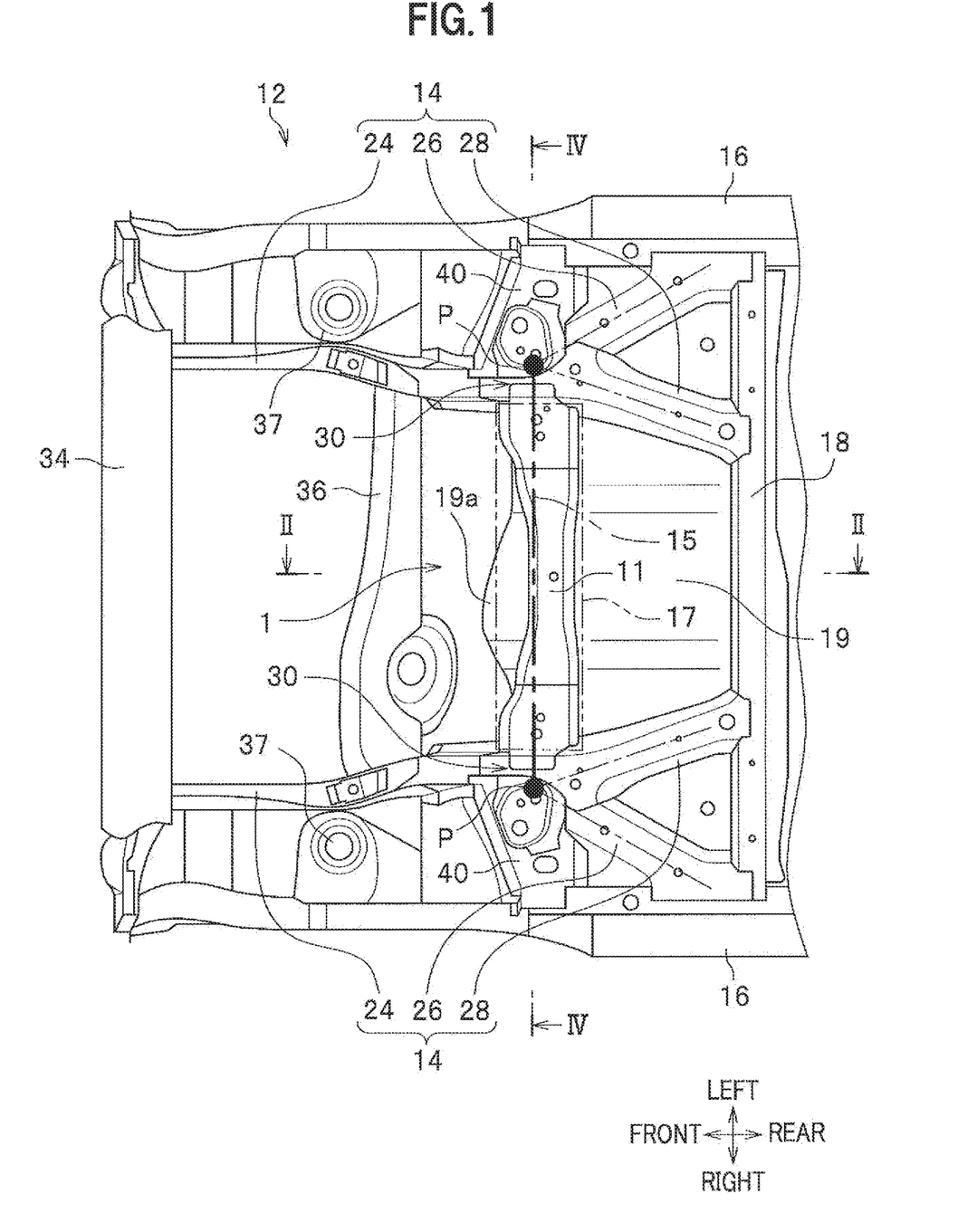
FIG. 1 is a partial bottom view of a back side of a vehicle body front structure to which a vehicle body floor structure of the present invention is applied.
Figure 2:
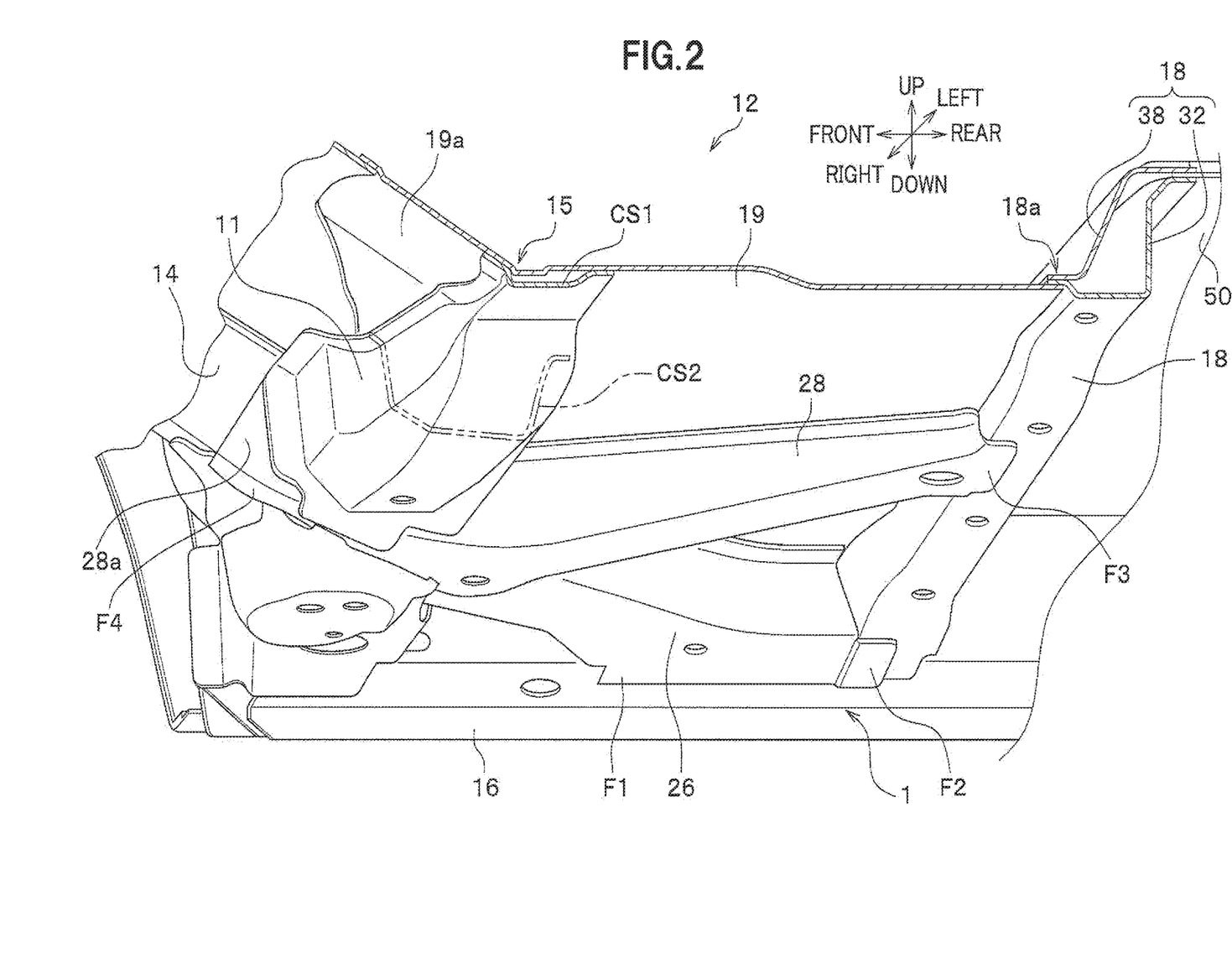
FIG. 2 is a partial perspective view including a cross-section taken along a line II-II of FIG. 1 and a back side of a floor panel of a vehicle body front portion looked up from obliquely lower left of a vehicle body.

FIG. 1 is a partial bottom view of a back side of the vehicle body front portion. FIG. 2 is a partial perspective view including a cross-section taken along a line II-II of FIG. 1 and a back side of the floor panel looked up from obliquely lower left of a vehicle body. As shown in FIGS. 1 and 2, a vehicle body 12 includes a pair of left and right front side frames 14, a pair of left and right side sills 16 (shown only in FIG. 1), a front seat support cross member 18 and a floor panel 19.

As shown in FIG. 1, the front side frame 14 extends in the front and rear direction on both left and right sides of the vehicle body front portion. The front side frame 14 includes a side frame body 24 constituting a front portion of the front side frame 14, and an outer frame 26 and an inner frame 28 constituting a rear portion of the front side frame 14.

The side frame body 24 is formed to have a substantially rectangular closed cross-section, and an outrigger 40 is disposed on a rear side face thereof so as to bulge outward in the vehicle width direction. An outer end in the vehicle width direction of the outrigger 40 is connected to a front end of the side sill 16. The outer frame 26 and the inner frame 28 constituting the rear portion of the front side frame 14 will be described in detail below.

As shown in FIG. 1, a bumper beam 34 extending in the vehicle width direction is bridged between the side frame bodies 24 at a front end of the vehicle body 12. Further, a dash board 36 for partitioning a power mounting compartment and a vehicle compartment (not shown) is disposed between the side frame bodies 24 extending in the front and rear direction. Furthermore, damper bases 37 for respectively supporting upper ends of left and right dampers (not shown) are arranged on both sides in the vehicle width direction in front of the dashboard 36.

As shown in FIG. 1, the side sills 16 are respectively disposed on both sides in the vehicle width direction. The side sills 16 extend in the front and rear direction of the vehicle body. Although not shown, the side sill 16 is made of a side sill inner disposed on an inner side in the vehicle width direction and a side sill outer disposed on an outer side in the vehicle width direction, which are joined to form a closed cross-section. A side sill stiffener sandwiched between the side sill inner and the side sill outer is disposed in a hollow portion of the side sill 16.

The front seat support cross member 18 supports a front portion of a front seat. As shown in FIG. 1, the front seat support cross member 18 extends in the vehicle width direction at a rear end of the floor panel 19. Both ends in the vehicle width direction of the front seat support cross member 18 are respectively fixed to the left and right side sills 16 by welding or the like.

As shown in FIG. 2, such a front seat support cross member 18 forms a closed cross-section by joining an upper member 38 and a lower member 32. The front seat support cross member 18 has a front flange 18a formed by joining front edges of the upper member 38 and the lower member 32. The rear member 32 and the upper member 38 are joined together by sandwiching a front end of the floor panel 50 at a rear portion of the vehicle body 12 therebetween.

As shown in FIG. 1, the floor panel 19 is formed of a flat plate-like member stretched between the side sills 16. As shown in FIG. 2, the rear end of the floor panel 19 is fixed to a lower surface of the front flange 18a of the front seat support cross member 18 by spot welding or the like.

Figure 3:
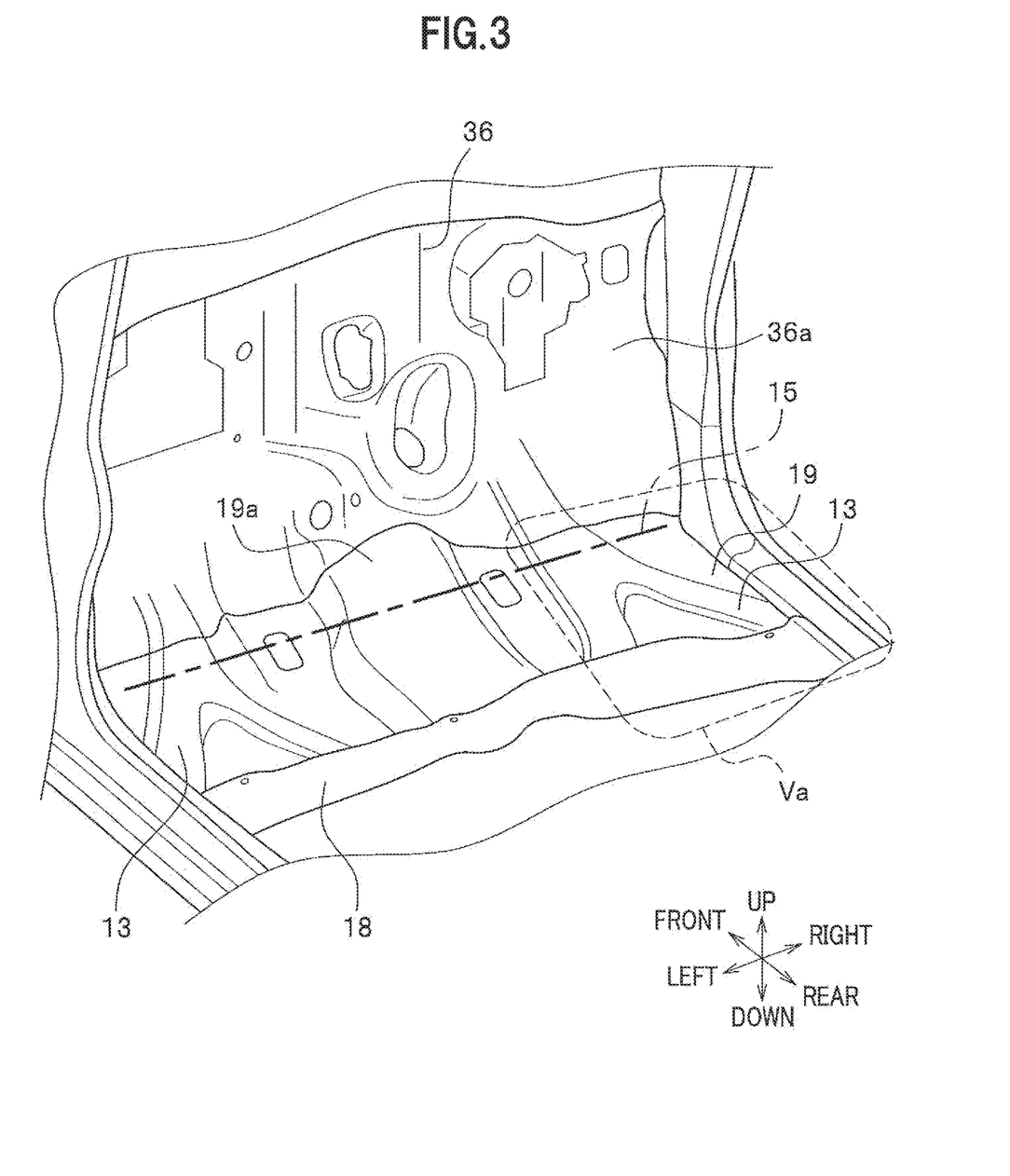
FIG. 3 is a partial perspective view of the floor panel and a dash lower panel in the vehicle body front portion looked down from a vehicle interior side.

FIG. 3 is a partial perspective view of the floor panel 19 and a dash lower panel 36a in the vehicle body front portion looked down from a vehicle interior side. As shown in FIG. 3, the floor panel 19 has a kick-up portion 15, which is formed in the vehicle width direction and is a base end rising upward while extending forward from the front seat support cross member 18 side. The floor panel 19 is raised with its extending direction upward with the kick-up portion 15 as a boundary. An upper end of the floor panel 19 in this raised state is fixed to a lower end of the dash lower panel 36a forming a lower portion of the dashboard 36 by welding or the like. In FIG. 3, reference numerals 13 indicate beads of the floor panel 19 constituting a vehicle body floor structure 1.

<<Vehicle Body Floor Structure>>

Next, the vehicle body floor structure 1 of the present embodiment will be described. As shown in FIG. 1, the vehicle body floor structure 1 includes a dash cross member 11, and the front side frame 14 having the outer frame 26 and the inner frame 28. As shown in FIG. 3, the vehicle body floor structure 1 also includes the floor panel 19 having beads 13.

<Dash Cross Member>

As shown in FIG. 1, the dash cross member 11 is disposed extending in the vehicle width direction between the front side frames 14. Specifically, the dash cross member 11 extends along the kick-up portion 15 of the floor panel 19. Preferably, an axis extending in the vehicle width direction of the dash cross member 11 is aligned with the kick-up portion 15 in the vertical direction. Incidentally, the axis of the dash cross member 11 in the present embodiment is defined by a line passing through centers in the front and rear direction at outer ends in the vehicle width direction of the dash cross member 11. In this preferred embodiment, slight deviation in the front and rear direction between the axis of the dash cross member 11 and the kick-up portion 15 is permitted.

An end portion in the vehicle width direction of the dash cross member 11 in the present embodiment is connected to the front side frame 14. Specifically, the end portion is connected to a position adjacent to a branch portion 30 between the outer frame 26 and the inner frame 28 described later.

Further, the dash cross member 11 according to the present embodiment has both outer sides in the vehicle width direction thick in the front and rear direction and is gradually thinner toward the inner side in the vehicle width direction in plan view from below. Further, as shown in FIG. 2, the dash cross member 11 has a substantially hat shape opening upward in a cross-sectional view intersecting its extending direction. A flange corresponding to a brim of the substantially hat shape is fixed to a lower surface of the floor panel 19 by spot welding or the like, so that the dash cross member 11 forms a closed cross-section in cooperation with the floor panel 19. In this dash cross member 11, a cross-section CS1 at a central portion in the vehicle width direction thereof is smaller than a cross-section CS2 at the end portion in the vehicle width direction thereof. Specifically, a bottom wall of the dash cross member 11 is positioned upward toward the central portion thereof.

Further, a suspension member 17 indicated by an imaginary line (two-dot chain line) in FIG. 1 is disposed below the dash cross member 11. The suspension member 17 is, for example, a cross member of a sub-frame. In this sub-frame, a power plant (not shown) is also mounted in addition to constituent parts of a suspension (not shown).

Figure 4:
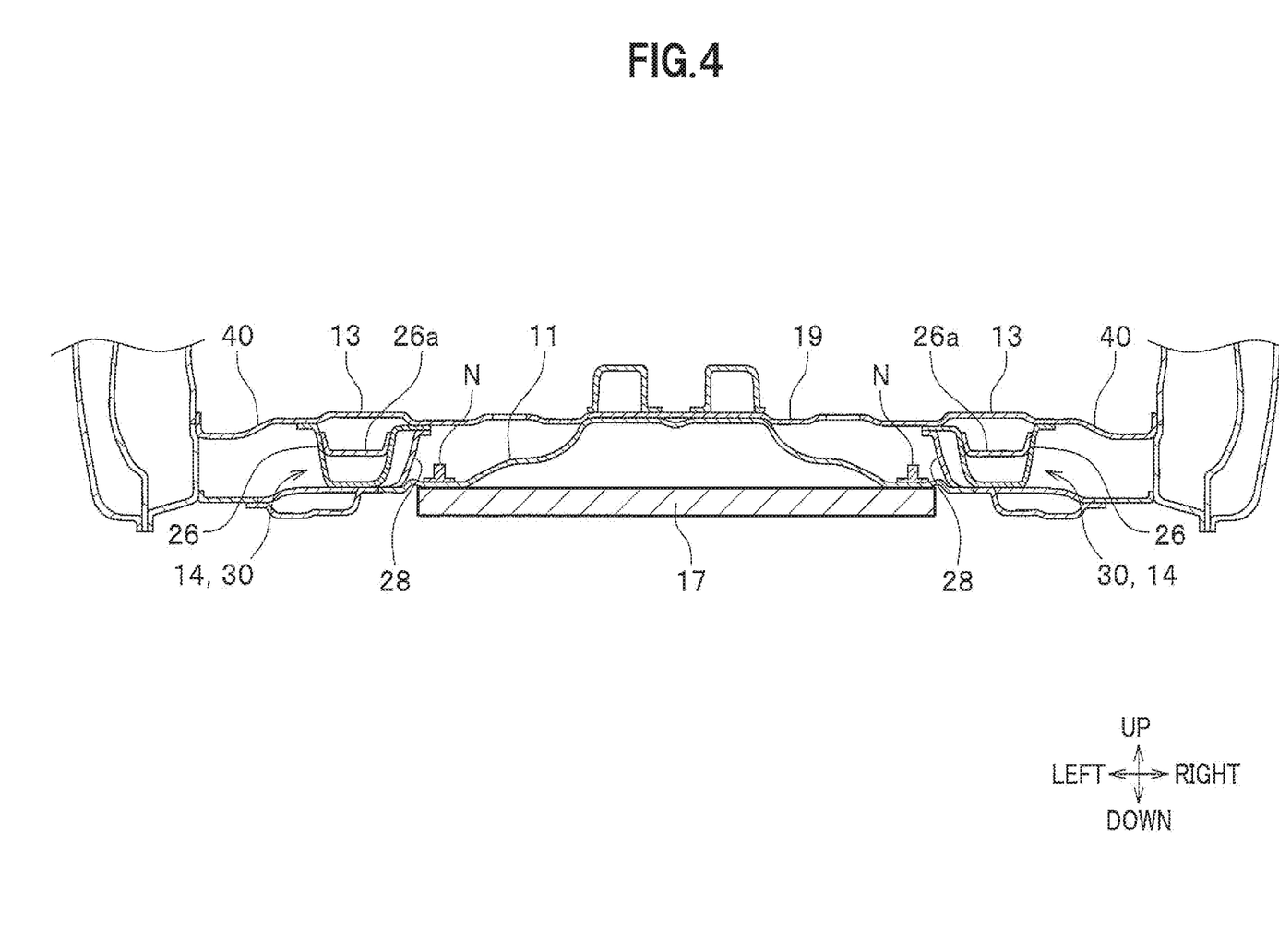
FIG. 4 is a cross-sectional view taken along a line IV-IV of FIG. 1.

As shown in FIG. 4 which is a cross-sectional view taken along a line IV-IV of FIG. 1, the suspension member 17 is, for example, fixed by bolts (not shown) fastened to plate nuts N arranged at the both ends in the vehicle width direction of the dash cross member 11. In FIG. 4, reference numerals 40 indicate outriggers, reference numerals 30 indicate the branch portions of the front side frames 14, reference numerals 26 indicate the outer frames at the branch portions 30, reference numerals 28 indicate the inner frames at the branch portions 30, and reference numerals 13 indicate the beads described later formed in the floor panel 19.

<Outer Frame and Inner Frame>

As described above, the outer frame 26 and the inner frame 28 constitute the rear portion of the front side frame 14. As shown in FIG. 1, the outer frame 26 and the inner frame 28 extend from the branch portion 30 disposed at the rear portion of the side frame body 24 respectively obliquely rearward and outward in the vehicle width direction and obliquely rearward and inward in the vehicle width direction. The "branch portion 30" can be determined with a branch point P as a center where the axes of the outer frame 26 and the inner frame 28 intersect, in plan view looking up from below the vehicle body 12.

As shown in FIG. 1, the outer frame 26 in the present embodiment is formed such that only a lower half of the side frame body 24 in a rectangular closed cross-sectional shape of the side frame body 24 has a substantially hat-shaped cross-section described later with the branch portion 30 as a boundary and extends along the lower surface of the floor panel 19. A rear end of the outer frame 26 is connected to the side sill 16. Specifically, the outer frame 26 extends toward a corner between the side sill 16 and the front seat support cross member 18.

As shown in FIG. 2, the outer frame 26 has a flange F1 bulging outward in the vehicle width direction and a flange F2 bulging rearward from a lower surface at the rear end of the outer frame 26. The rear end of the outer frame 26 is fixed by connecting the flange F1 to a lower surface of the side sill 16 by spot welding or the like and by connecting the flange F2 to a lower surface of the front seat support cross member 18 by spot welding or the like.

As shown in FIG. 4, a cross-section of the outer frame 26 has a substantially hat shape opening upward. In FIG. 4, reference numeral 26a indicates a stiffener (reinforcing member) described later which is disposed inside the outer frame 26 at the branch portion 30.

As shown in FIG. 1, the inner frame 28 extends obliquely rearward and inward in the vehicle width direction as described above from a base end thereof connected to an inner side surface of the outer frame 26 in the branch portion 30. As shown in FIG. 2, the inner frame 28 has a flange F3 protruding rearward from a lower surface at a rear end of the inner frame 28. The rear end of the inner frame 28 is fixed by connecting the flange F3 to the lower surface of the front seat support cross member 18 by spot welding or the like.

As shown in FIG. 2, the inner frame 28 includes a vertical wall surface 28a extending along an inner surface of the outer frame 26 and a flange F4 extending from a lower end of the vertical wall surface 28a along the lower surface of the outer frame 26 at the base end of the inner frame 28. The base end of the inner frame 28 is fixed by respectively connecting the vertical wall surface 28a and the flange F4 to the inner surface and the lower surface of the outer frame 26 by spot welding or the like. Although not shown, a cross-section of the inner frame 28 has a substantially hat shape opening upward similarly to the cross-section of the outer frame 26.

<Bead>

Next, the beads 13 (see FIG. 3) formed in the floor panel 19 (see FIG. 3) will be described. As shown in FIG. 3, the bead 13 in the present embodiment is formed to extend from the dash lower panel 36a to the floor panel 19. The bead 13 is formed protruding upward on a plate surface of the floor panel 19.

The bead 13 in the present embodiment is formed in the floor panel 19 and is constituted by a part formed in a bifurcated manner from the front to the rear and a part linearly extending forward from the bifurcated branch portion. The linearly extending bead portion extends continuously between the floor panel 19 and the dash lower panel 36a.

It is assumed that a portion of the floor panel 19 where the beads 13 is formed in the present embodiment is formed of a steel material having higher strength than the dash lower panel 36a. Specifically, it is assumed that an ordinary steel plate is used for the dash lower panel 36a, and a high-tensile steel plate made of high-tensile steel or the like is used for the portion of the floor panel 19 where the bead 13 is formed.

Further, in the present embodiment, it is assumed that a high strength steel material is used for a portion of the floor panel 19 located at least behind the kick-up portion 15 and in front of the front seat support cross member 18. In other words, the high strength steel material is used for the portion of the floor panel 19 located behind the dash cross member 11 (see FIG. 1) disposed along the kick-up portion 15. Incidentally, the high strength steel material is used for at least the portion of the floor panel 19 where the bifurcated bead 13 is formed. The floor panel 19 may be configured such that the high strength steel material is also used for a portion in front of the kick-up portion 15, in other words, for an extension portion 19a in front of the dash cross member 11 (see FIG. 1).

Figure 5A:
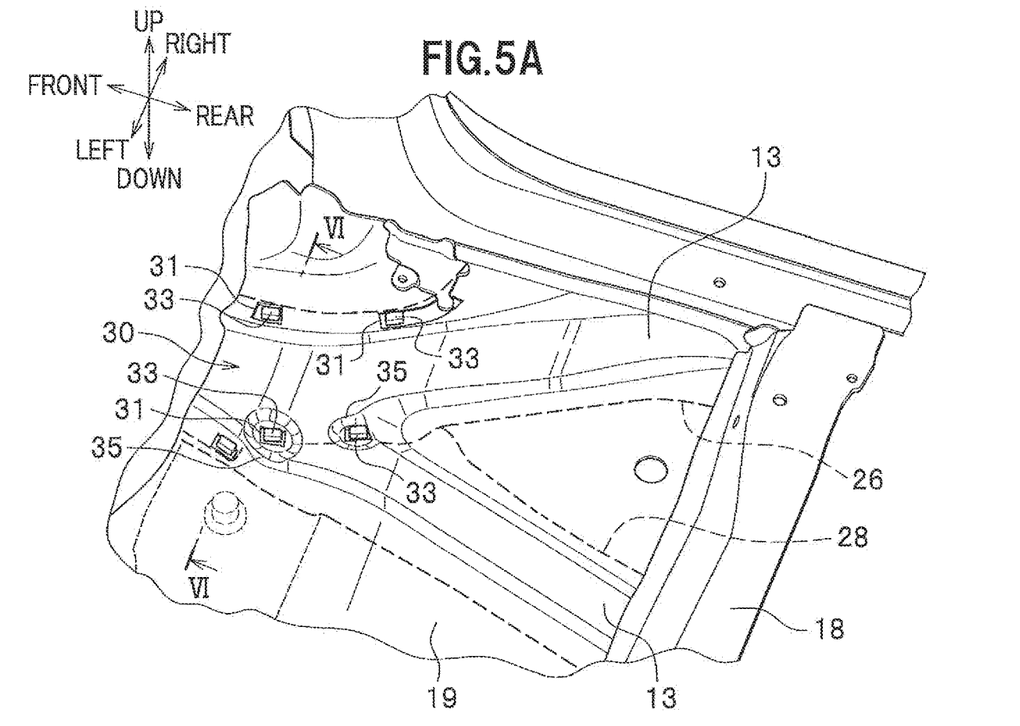
FIG. 5A is a partial perspective view of a Va portion in FIG. 3 looked down from above a central portion in a vehicle width direction of the floor panel.
Figure 5B:
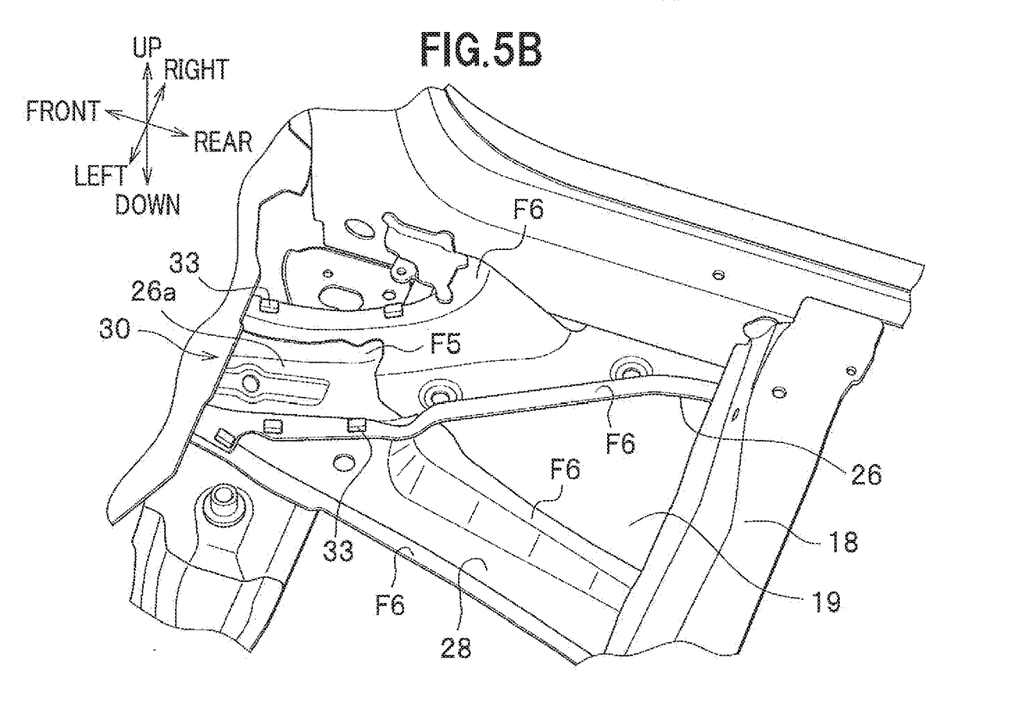
FIG. 5B is a partial perspective view showing a state where the floor panel shown in FIG. 5A is removed.
Figure 6:
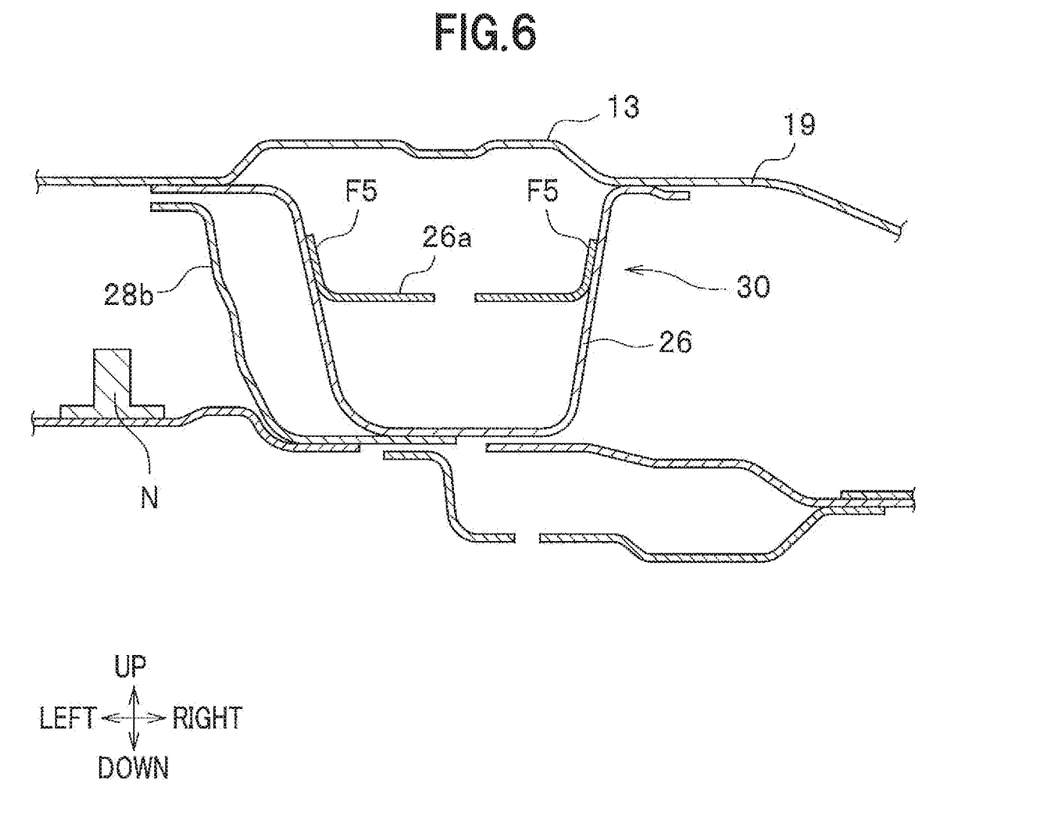
FIG. 6 is a cross-sectional view taken along a line VI-VI of FIG. 5A.

FIG. 5A is a partial perspective view of a Va portion in FIG. 3 looked down from above a central portion in the vehicle width direction of the floor panel, and FIG. 5B is a partial perspective view showing a state of the outer frame and the inner frame facing upward when the floor panel shown in FIG. 5A is removed. FIG. 6 is a cross-sectional view taken along a line VI-VI of FIG. 5A. In FIG. 5A, the outer frame 26 and the inner frame 28 are indicated by hidden lines (dotted lines).

As shown in FIG. 5A, the beads 13 formed in the floor panel 19 are formed corresponding to the outer frame 26 and the inner frame 28 extending from the branch portion 30 to the front seat support cross member 18. That is, the bead 13 is formed in the floor panel 19 so as to open rearward in a V-shape in plan view in accordance with branch directions of the outer frame 26 and the inner frame 28.

As shown in FIG. 6, the bead 13 formed protruding upward on the floor panel 19 has a substantially hat shape in a cross-sectional view in a direction intersecting an extending direction of the bead 13. In FIG. 6 which is a VI-VI cross-section of the branch portion 30 of FIG. 5A, the bead 13 is configured to be joined with the substantially hat-shaped outer frame 26 opening upward, at brims thereof so that mountain portions thereof are directed opposite to each other, and forms a closed cross-section in cooperation with the outer frame 26. That is, each of the beads 13 vertically overlaps with the outer frame 26 to increase the closed cross-section in cooperation with the outer frame 26. In FIG. 6, reference numeral 26a indicates the stiffener (reinforcing member) disposed in the outer frame 26. As shown in FIG. 5B, the stiffener 26a is formed of a plate body having a face portion facing a bottom surface of the outer frame 26. As shown in FIG. 6, the stiffener 26a is fixed to the inner surface of the outer frame 26 via flanges F5 by welding or the like.

In FIG. 6, reference numeral 28b indicates the base end of the inner frame 28 connected to the outer frame 26 at the branch portion 30. Although not shown, the inner frame 28 indicated by the hidden lines (dotted lines) in FIG. 5A cooperates with an opposing bead 13 to form a closed cross-section. Similarly to the closed cross-section formed by the outer frame 26 and the bead 13, the inner frame 28 is also configured to be joined with the beard 13 at brims thereof so that mountain portions thereof are directed opposite to each other.

Joining of the outer frame 26 and the inner frame 28 to the floor panel 19 having such a bead 13 is performed at least via flanges F6 (see FIG. 5B) formed in the outer frame 26 and the inner frame 28. As shown in FIG. 5A, joining of the outer frame 26 or the inner frame 28 to the floor panel 19 at the branch portion 30 is performed via openings 31 formed in the floor panel 19.

Specifically, protrusions 33 formed on the outer frame 26 or the inner frame 28 are fitted into the openings 31, and heads of the protrusions 33 are swaged so that the outer frame 26 or the inner frame 28 and the floor panel 19 are joined. As shown in FIG. 5B, the protrusions 33 are formed on the flanges F6 of the outer frame 26 in the present embodiment.

As shown in FIG. 5A, when the protrusions 33 are formed at positions corresponding to portions of the floor panel 19 where the beads 13 are formed, concave portions 35 recessed downward corresponding to positions of the protrusions 33 are formed in the corresponding portions of the beads 13 of the floor panel 19. The openings 31 are formed at bottoms of the concave portions 35. Further, joining of the floor panel 19 to the outer frame 26 or the inner frame at portions other than the branch portion 30 can also be performed by welding.

<<Operational Effect>>

Next, operational effect of the vehicle body floor structure 1 of the present embodiment will be described. In the vehicle body floor structure 1 as described above, since the floor panel 19 using the high strength steel material is disposed up to a point of covering the kick-up portion 15, bending strength of the kick-up portion 15 can be improved. Further, in the vehicle body floor structure 1 of the present embodiment, since the beads 13 opening in a V-shape are formed on the floor panel 19, it is possible to remove the upper reinforcing member of the floor panel used in the conventional vehicle body floor structure (for example, see Patent Document 1). Furthermore, in the vehicle body floor structure 1 of the present embodiment, it is possible to form the closed cross-sections between the dash cross member 11 and the floor panel 19, and between the bead 13 of the floor panel 19 and each of the outer frame 26 and the inner frame 28. As a result, the vehicle floor structure 1 can effectively prevent deformation of the floor panel 19 corresponding to feet of a passenger by receiving a shear load at the time of offset collision by the closed cross-sections increased by the beads 13.

Further, in the vehicle body floor structure 1 of the present embodiment, the cross-section CS1 at the central portion in the vehicle width direction of the dash cross member 11 is smaller than the cross-section CS2 at the end portion in the vehicle width direction thereof. Thus, in the vehicle body floor structure 1, it is easy to arrange members such as piping below the dash cross member 11. Further, in the vehicle body floor structure 1 of the present embodiment, the floor panel 19 has the extension portion 19a extending forward of the dash cross member 11. In addition, the extension portion 19a can be formed of a steel material having higher strength than the dash lower panel 36a. According to such a vehicle body floor structure 1, it is possible to further improve bending strength of the kick-up portion 15 by improving strength of the extension portion 19a.

In the vehicle body floor structure 1 of the present embodiment, the suspension member 17 is fixed to both end portions in the vehicle width direction of the dash cross member 11. According to such a vehicle body floor structure 1, even when the cross-section of the central portion of the dash cross member 11 is reduced, sufficient vehicle body rigidity can be obtained. In addition, when a collision load is input from a side surface of the vehicle body 12, the collision load is transmitted via the outrigger 40, the branch portion 30, and the suspension member 17, so that the side collision load is efficiently absorbed.

In the vehicle body floor structure 1 of the present embodiment, the branch portion 30 and the floor panel 19 made of a high strength steel material are coupled to each other via the openings 31. According to such a vehicle body floor structure 1, strength of the branch portion 30 is further improved.

Further, in the vehicle body floor structure 1 of the present embodiment, the closed cross-section formed by the outer frame 26 or the inner frame 28 and the bead 13 is formed by joining members having a hat-shaped cross-sectional shape at brims thereof so that mountain portions thereof are directed opposite to each other. According to such a vehicle body floor structure 1, the outer frame 26 and the inner frame 28 having a large closed cross-section and excellent load transmission can be formed lightweight.

In the vehicle body floor structure 1 of the present embodiment, the branch portion 30 and the floor panel 19 made of a high strength steel material are coupled to each other in the concave portions 35 partially formed in the bead 13. According to such a vehicle body floor structure 1, the branch portion 30 and the portions of the floor panel 19 where the beads 13 are formed can be joined to each other while maintaining shapes of the beads 13 as much as possible. As a result, it is possible to prevent deterioration of bending moment suppression performance of the kick-up portion 15.

In the vehicle body floor structure 1 of the present embodiment, the rear end of the floor panel 19 made of a high strength steel plate is joined to the front seat support cross member 18 from below. According to such a vehicle floor structure 1, the flange F1 and the flange F2 formed at the rear end of the outer frame 26 and the flange F3 formed at the rear end of the inner frame 28 can be connected to the lower surface of the front seat support cross member 18 or the side sill 16. Therefore, according to the vehicle body floor structure 1, it is possible to easily perform assembly of the vehicle body by placing a front end of a vehicle body rear portion on a rear end of the vehicle body front portion when joining the vehicle body front portion and the vehicle body rear portion, to which respective members are assembled in advance.

Although the embodiment of the present invention has been described above, the present invention is not limited to the above embodiment but can be implemented in various forms. In the above embodiment, although the outer frame 26 is formed by extending the lower half of the side frame body 24, the inner frame 28 may be formed by extending the lower half of the side frame body 24. In this case, a base end of the outer frame 26 is connected to an outer surface of the inner frame 28 at the branch portion 30. Further, in the above embodiment, although the protrusions 33 are provided on the outer frame 26, the protrusions 33 may be provided on the inner frame 28. Furthermore, it is also possible to provide the openings 31 on both the floor panel 19 and the branch portion 30. In this case, the floor panel 19 and the branch portion 30 are joined to each other by fasteners or the like vertically inserted into both the openings 31.

REFERENCE SIGNS LIST

1: vehicle body floor structure
11: dash cross member
12: vehicle body
13: bead
14: front side frame
15: kick-up portion
16: side sill
17: suspension member
18: front seat support cross member
18a: front flange
19: floor panel
19a: extension portion
24: side frame body
26: outer frame
26a: stiffener
28: inner frame
30: branch portion
31: opening
33: protrusion
35: concave portion
36a: dash lower panel
40: outrigger
CS1: cross-section
CS2: cross-section

The invention claimed is:

1. A vehicle body floor structure comprising:
a dash cross member extending in a vehicle width direction along a kick-up portion which raises an upper end of a floor panel toward a lower end of a dash lower panel;
a front side frame having an outer frame extending obliquely rearward and outward in the vehicle width direction from a branch portion formed in a rear portion of a side frame body extending in a longitudinal direction on both sides in the vehicle width direction, and having an inner frame extending obliquely rearward and inward in the vehicle width direction from the branch portion with a rear end fixed to a front seat support cross member supporting a front portion of a front seat; and
beads formed in the floor panel to extend and open rearward in a V-shape in plan view according to branch directions of the outer frame and the inner frame, wherein
the branch portion of the front side frame is formed adjacent to an end portion in the vehicle width direction of the dash cross member,
a floor panel portion located at least behind the dash cross member and in front of the front seat support cross member is formed of a steel material having higher strength than the dash lower panel, and
each of the corresponding beads and the outer frame or the inner frame are overlapped in a vertical direction to increase a closed cross-section in cooperation with each other.

2. The vehicle body floor structure according to claim 1, wherein
a cross-section of central portion in the vehicle width direction of the dash cross member is smaller than a cross-section of end portion in the vehicle width direction thereof, and
the floor panel has an extension portion extending forward of the dash cross member and the extension portion is formed of a steel material having higher strength than the dash lower panel.

3. The vehicle body floor structure according to claim 1, wherein a suspension member is fixed to both end portions in the vehicle width direction of the dash cross member.

4. The vehicle body floor structure according to claim 1, wherein the branch portion and the floor panel made of a high strength steel material are coupled to each other through an opening formed in either one of the branch portion and the floor panel.

5. The vehicle body floor structure according to claim 1, wherein a closed cross-section formed by the outer frame or the inner frame and the corresponding bead is configured such that portions having a hat shaped cross-sectional shape are joined to each other at brims thereof so that hat shaped mountain portions are directed opposite to each other.

6. The vehicle body floor structure according to claim 1, wherein the branch portion and the floor panel made of a high strength steel material are coupled to each other in concave portions partially formed in the bead.

7. The vehicle body floor structure according to claim 1, wherein a rear end of the floor panel made of a high strength steel plate is joined to the front seat support cross member from below.

* * * * *